(12) United States Patent
Haga

(10) Patent No.: US 6,577,580 B2
(45) Date of Patent: Jun. 10, 2003

(54) LOADING DEVICE IN MAGNETOOPTICAL DISC RECORDING APPARATUS

(75) Inventor: Toshio Haga, Sukagawa (JP)

(73) Assignee: Tohei Industrial Co., Ltd., Fukushima (JP)

( * ) Notice: Subject to any disclaimer, the term of this patent is extended or adjusted under 35 U.S.C. 154(b) by 140 days.

(21) Appl. No.: 09/835,953

(22) Filed: Apr. 16, 2001

(65) Prior Publication Data
US 2002/0012311 A1 Jan. 31, 2002

(30) Foreign Application Priority Data
Jul. 28, 2000 (JP) .................................. 2000-005381

(51) Int. Cl.[7] .............................................. G11B 17/04
(52) U.S. Cl. ..................................... 369/77.1; 369/270
(58) Field of Search ........................... 369/77.1, 270, 369/271

(56) References Cited

U.S. PATENT DOCUMENTS

| | | | | |
|---|---|---|---|---|
| 5,173,894 A | * | 12/1992 | Kido | 369/77.1 |
| 6,084,838 A | * | 7/2000 | Tanaka et al. | 369/77.1 |
| 6,108,294 A | * | 8/2000 | Iwanaga | 369/270 |
| 6,198,713 B1 | * | 3/2001 | Sakurai et al. | 369/77.1 |
| 6,345,030 B1 | * | 2/2002 | Sakurai et al. | 369/192 |
| 6,449,234 B1 | * | 9/2002 | Ahn et al. | 369/77.1 |
| 2002/0012311 A1 | * | 1/2002 | Haga | 369/77.1 |

* cited by examiner

Primary Examiner—Brian E. Miller
(74) Attorney, Agent, or Firm—Zito tlp; Joseph J. Zito (57) ABSTRACT

To provide a loading device in a magnetooptical disc recording apparatus having a sufficiently wide space for the magnetooptical disc between an elevation mechanism and a driving unit without positioning a holder lever constituting the elevation mechanism between a clamper and the driving unit, and a space for avoiding contact between the holder lever and the magnetooptical disc, an elevation mechanism and a plurality of holder levers are disposed removably in a radially outward direction to be substantially flush with the clamper and adapted to give a vertical motion and a opening and closing operation in a radial direction to the holder lever in cooperation with the rotation of the clamper base. When the magnetooptical disc is loaded or unloaded, the clamper is moved upwardly by engagement with the holder lever to maintain said sufficient space. When the magnetooptical disc is rotated, the holder levers are separated away from the magnetooptical disc through the guide cams while being released outwardly to avoid said contact.

1 Claim, 6 Drawing Sheets

LOADING DEVICE IN MAGNETOOPTICAL DISC RECORDING APPARATUS

BACKGROUND OF THE INVENTION

The present invention relates to an improvement in a loading device in an apparatus for recording a magnetooptical disc such as DVD-ROM, CD-ROM, CD for automotive vehicles or the like.

A conventional magnetooptical disc recording apparatus is designed in view of miniaturizing and making thinner.

In particular, a loading device for loading a magnetooptical disc for recording and reproducing information by using a laser beam to the magnetooptical disc and removing the used magnetooptical disc from above a driving unit to the outside is miniaturized and thinned.

As is well known, the loading device is adapted to insert the loaded magnetooptical disc between the driving unit and a clamper disposed movably up and down above the driving unit, to hold the magnetooptical disc on the driving unit and to lower the clamper, to clamp and hold the magnetooptical disc by driving unit and the clamper. An elevation mechanism for moving the clamper up and down is disposed on the lower surface of the clamper and a space into which the magnetooptical disc is to be inserted is formed between the elevation mechanism and the driving unit.

However, since the loading device is also to be designed to be thinned and miniaturized, the space into which the magnetooptical disc is to be inserted is also made small down to its limit. There is a high possibility that the elevation mechanism and the magnetooptical disc or the elevation mechanism and the clamper would be brought into contact with each other, causing a damage of the magnetooptical disc and a defect in the clamper.

SUMMARY OF THE INVENTION

Accordingly an object of the present invention is to provide a loading device in a magnetooptical disc recording apparatus that may keep a sufficiently wide space between an elevation mechanism and a driving unit when the magnetooptical disc is loaded or unloaded without positioning a holder lever constituting the elevation mechanism between a clamper and the driving unit, and may keep a space for avoiding contact between the holder lever and the magnetooptical disc when the clamper and the magnetooptical disc are attracted to the driving unit and rotated.

In order to attain the above objects, the present invention has the following technical means. Namely, according to the present invention there is provided a loading device in a magnetooptical disc recording apparatus for performing recording and reproducing information by using a laser beam to a magnetooptical disc;

the loading device comprising:
a chassis received and held in a receiving case of the magnetooptical disc recording apparatus, having a circular first opening portion substantially at a center and having an upper surface of a ceiling plate around the first opening portion as a support surface,
a driving unit having at a central portion an attracting portion to face an interior of the first opening portion and to support the magnetooptical disc and being drivingly rotated;
a disc-shaped clamper disposed at a predetermined gap immediately above the driving unit, having at a central portion of a lower surface an attracted portion and having a flange at a circumferential edge of an upper surface; and
an elevation mechanism disposed to be substantially flush with an outer circumference of the clamper so as to engage with and release the circumference of the flange of the clamper to move it up and down,
and being characterized by that the elevation mechanism has a plurality of retainer pins arranged at an equal interval on a circumference around the first opening portion on the ceiling plate of the chassis; an annular clamper base in which a second opening portion having substantially the same shape as that of the first opening portion is formed in the central portion and a plurality of arcuate elongate holes fitted and retained with the plurality of retainer pins are arranged at an equal interval on a circumference around the second opening portion and which is supported rotatably onto a support surface; a clamper base rotating means for drivingly rotating the clamper base along the plurality of arcuate elongate holes in a forward direction or a reverse direction by an inserting or a drawing action of the magnetooptical disc; and a plurality of flexible holder levers supported rotatably to a plurality of pivot shafts arranged at an equal interval around the second opening portion of the clamper base, provided at one end with retainer pieces projecting and slanting downwardly to face the inside and provided at the other end with cam grooves bent in a longitudinal direction for retaining the plurality of retainer pins, and
that a plurality of first cutaway portions are formed around a circumferential edge of the first opening portion of the chassis, a plurality of second cutaway portions are formed also in a circumferential edge of the second opening portion of the clamper base corresponding to the first cutaway portions and guide cams that move the ends of the holder levers upwardly by the rotation to the outside are formed to project in end portions at the circumferential direction sides of the respective first cutaway portions.

With such an arrangement, when the magnetooptical disc is loaded onto the driving unit, the elevation mechanism of the loading device rotates the retainer pieces at ends of the holder levers that are extended obliquely downwardly through the first cutaway portions and the second cutaway portions overlapped therewith, to move them outwardly by the forward rotation of the clamper base and by the guidance of the cam grooves. The clamper that has been released away from the retainer pieces is lowered and attracted onto the driving unit for supporting the magnetooptical disc. The ends of the retainer levers released away from the clamper ride on the guide cams to be kept in a standby condition to thereby keep a sufficiently wide space at the time of the rotation of the magnetooptical disc.

Also, when the magnetooptical disc is inserted or removed, the ends of the holder levers are rotated to move inwardly by the reverse rotation of the clamper base so that the retainer pieces slanted downwardly are retained at the lower surface of the flange of the clamper, and the retainer pieces at the ends of the holder levers are swung upwardly on, as fulcrums, the end portions of the circumferential direction sides of the first cutaway portion moving in the same direction by the further reverse rotation of the clamper base. The above-described clamper is separated away from the drive unit to be brought into the standby condition in the upper position to thereby keep a sufficiently wide space between the elevation mechanism and the driving unit.

Accordingly, the elevation mechanism and a plurality of holder levers constituting the elevation mechanism are disposed removably in a radially outward direction to be substantially flush with the clamper. The vertical motion and the opening and closing operation in the radial direction are given to the holder levers in cooperation with the rotation of the clamper base. As a result, when the magnetooptical disc is loaded or unloaded, the clamper is moved upwardly by the engagement with the holder levers. When the magnetooptical disc is rotated, the holder levers are separated from the surface of the magnetooptical disc through the guide cams while the holder levers being separated away to the outside of the clamper. It is therefore possible to keep a sufficiently wide space between the elevation mechanism and the driving unit and to realize the thinning of the loading apparatus.

DESCRIPTION OF THE PREFERRED EMBODIMENTS

Figure 1:
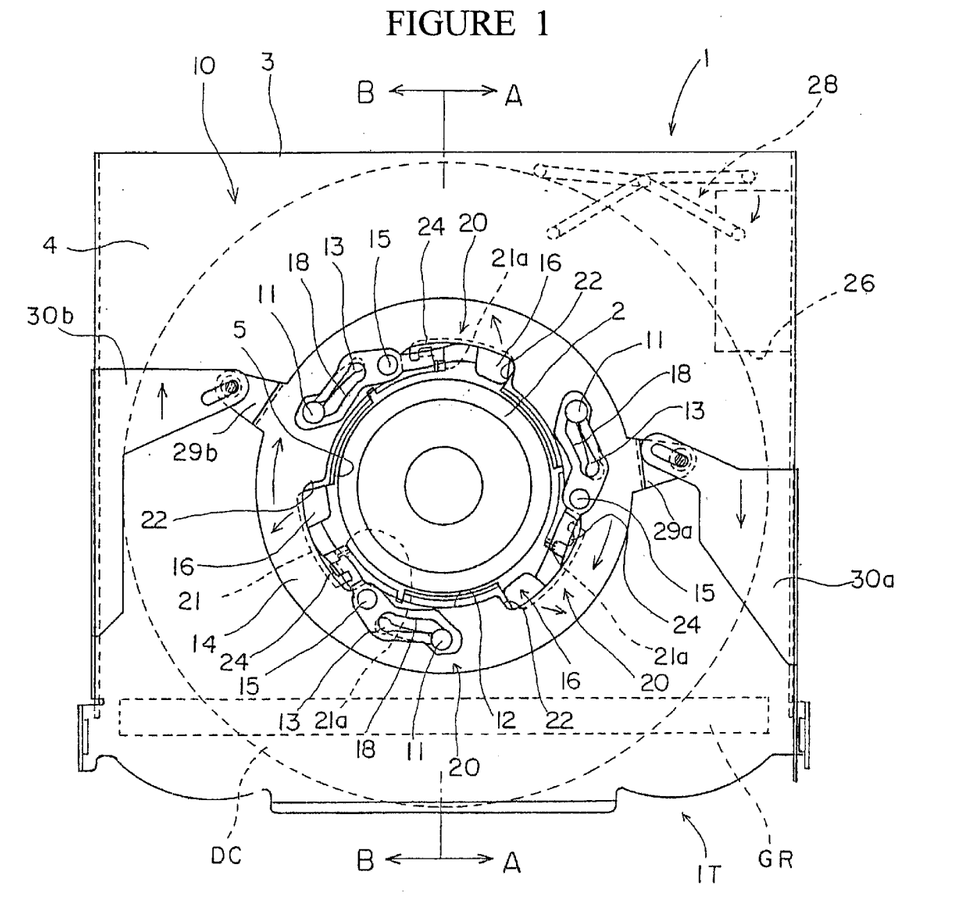
FIG. 1 is a plan view showing a state in which a magnetooptical disc is clamped by a clamper of a loading device in a magnetooptical disc recording apparatus in accordance with one embodiment of the present invention.
Figure 2:
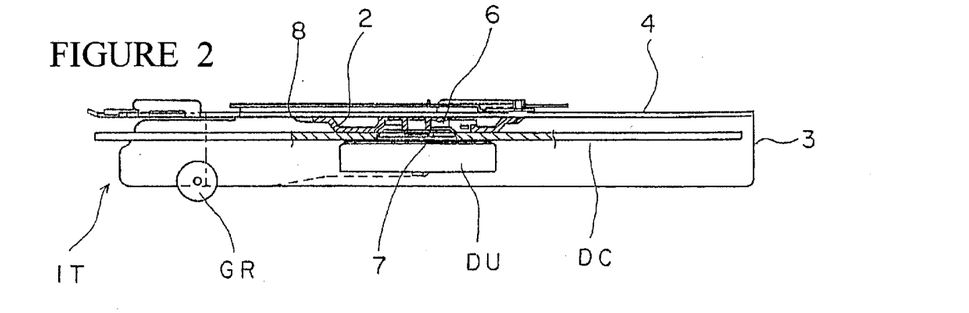
FIG. 2 is a cross-sectional view taken along the line B—B of FIG. 1.
Figure 3:
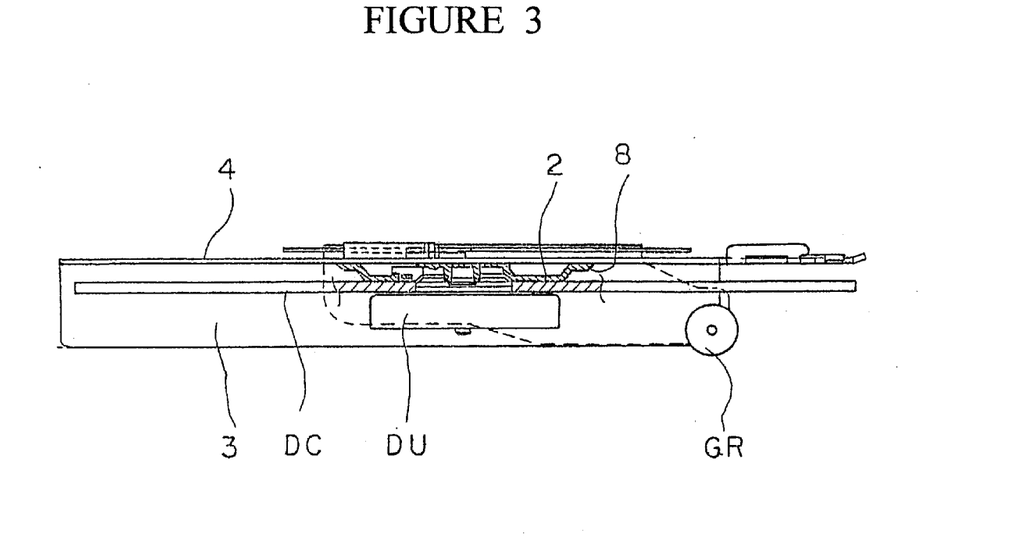
FIG. 3 is a cross-sectional view taken along the line A—A of FIG. 1.
Figure 4:
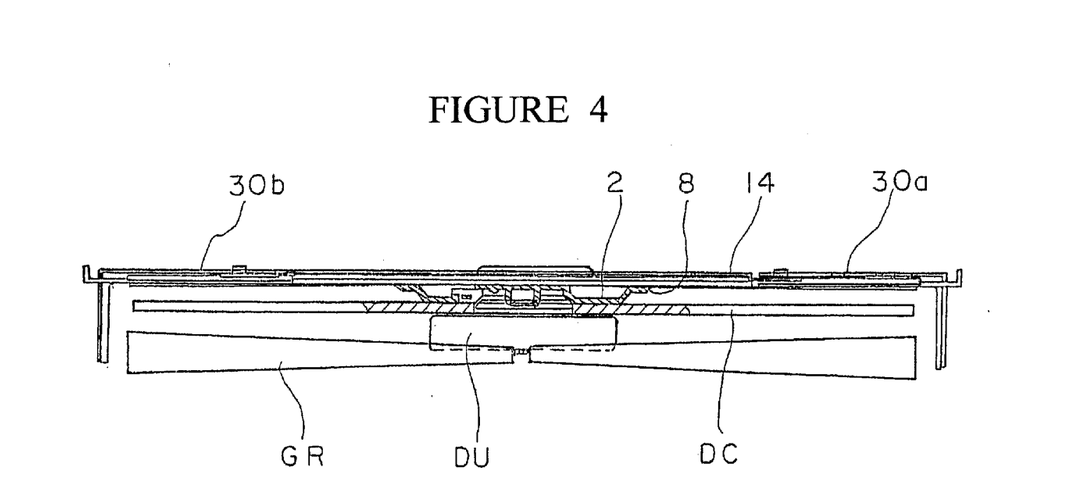
FIG. 4 is a frontal view.
Figure 5:
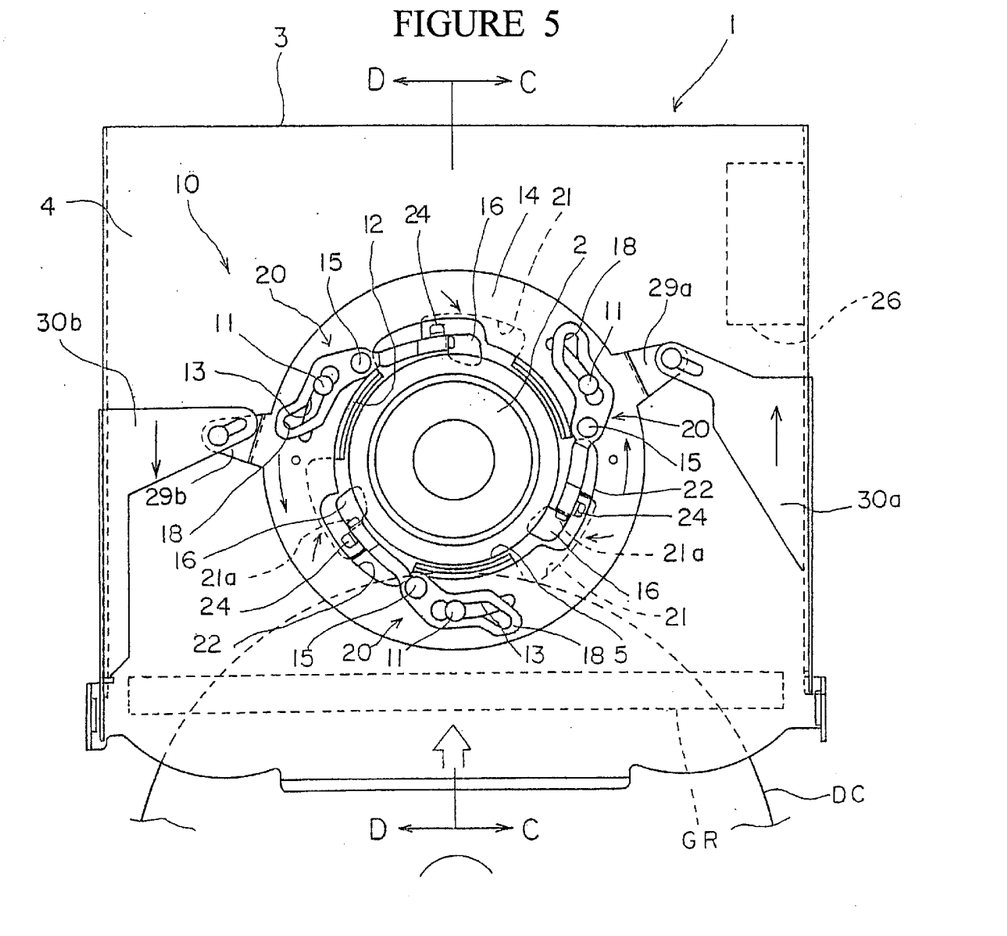
FIG. 5 is a plan view showing a state in which the clamper of the loading device in the magnetooptical disc recording apparatus is opened and the magnetooptical disc is loaded or unloaded.
Figure 6:
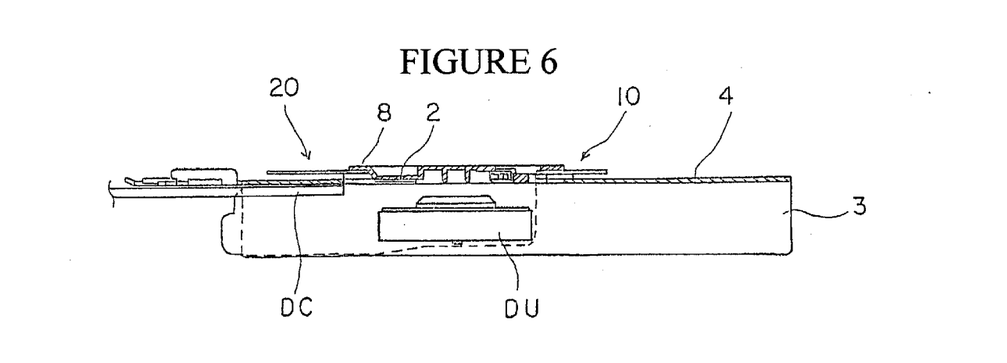
FIG. 6 is a cross-sectional view taken along the line D—D of FIG. 5.
Figure 7:
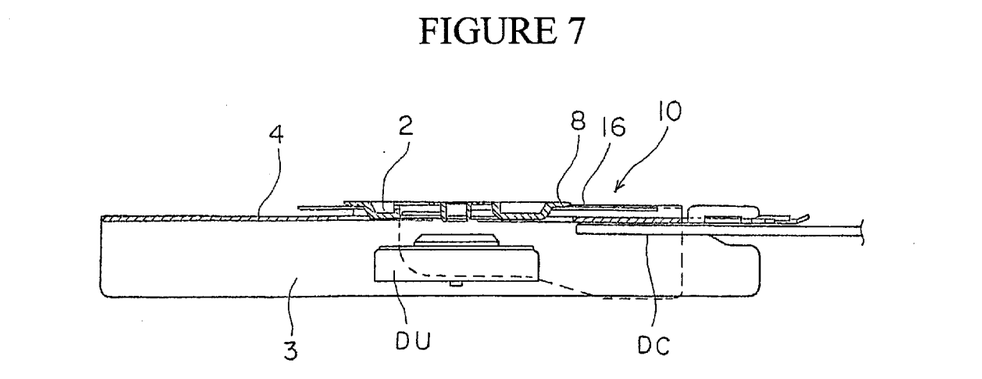
FIG. 7 is a cross-sectional view taken along the line C—C of FIG. 5.
Figure 8:
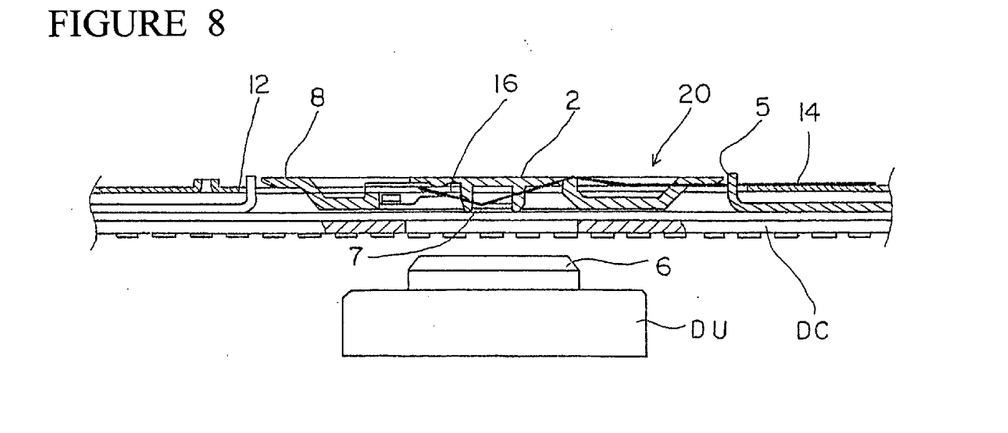
FIG. 8 is a partial cross-sectional view showing a state in which the magnetooptical disc is positioned on the clamper located immediately above the driving unit.
Figure 9:
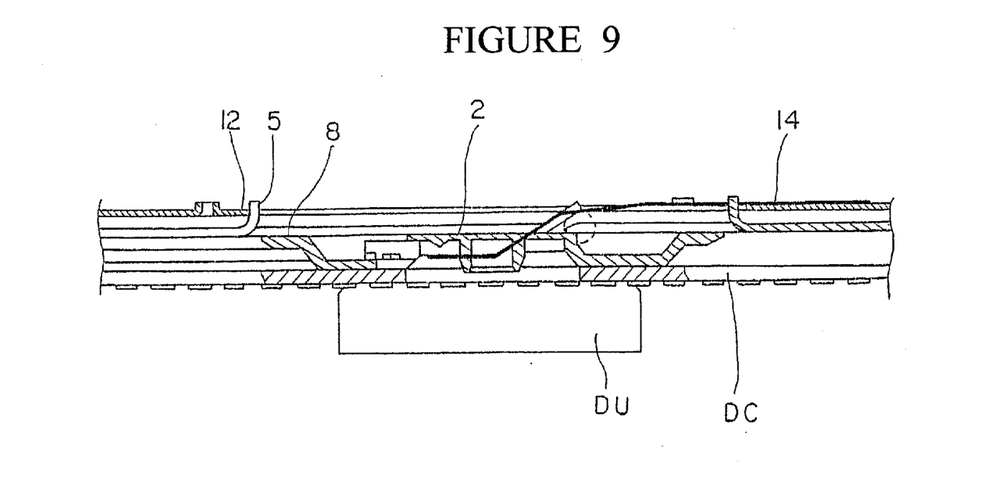
FIG. 9 is a partial cross-sectional view showing a state in which the magnetooptical disc on the driving unit is clamped by the clamper.
Figure 10:
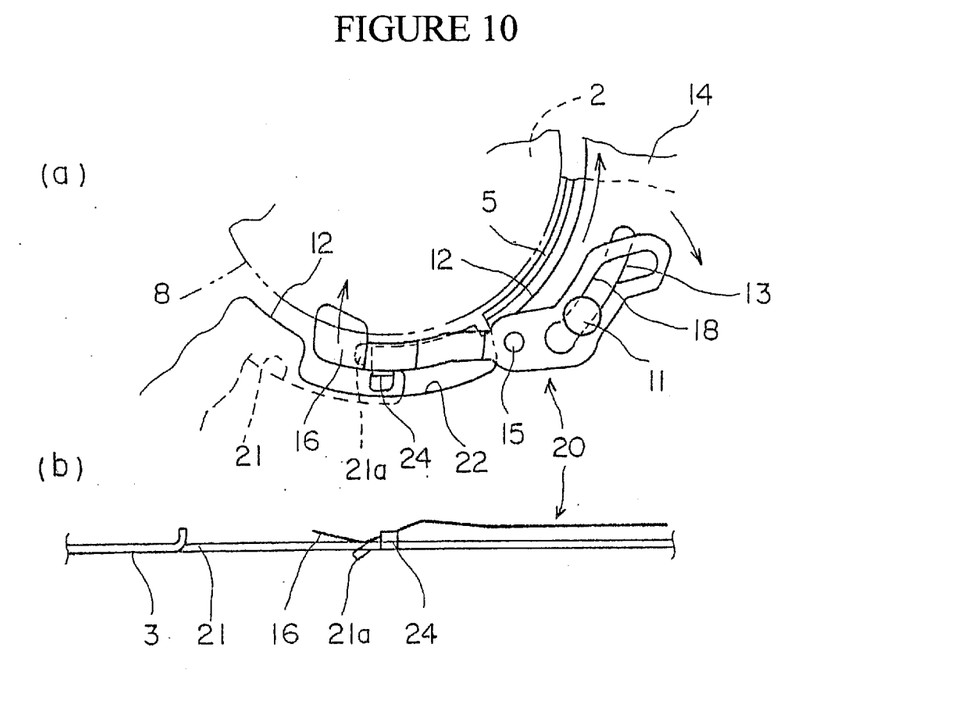
FIGS. 10A and 10B are illustrations of the operation showing a state in which the clamper is moved upwardly by a retainer piece of a holder lever by a reverse rotation of a clamper base.
Figure 11:
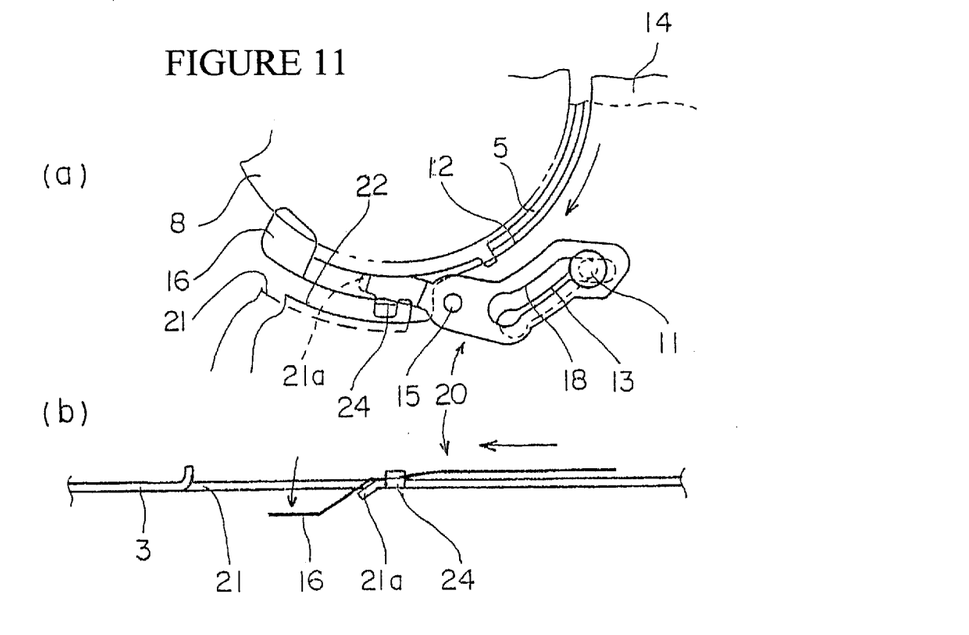
FIGS. 11A and 11B are illustrations of the operation showing a state in which the clamper is moved downwardly by the retainer piece of the holder lever by a forward rotation of the clamper base.
Figure 12:
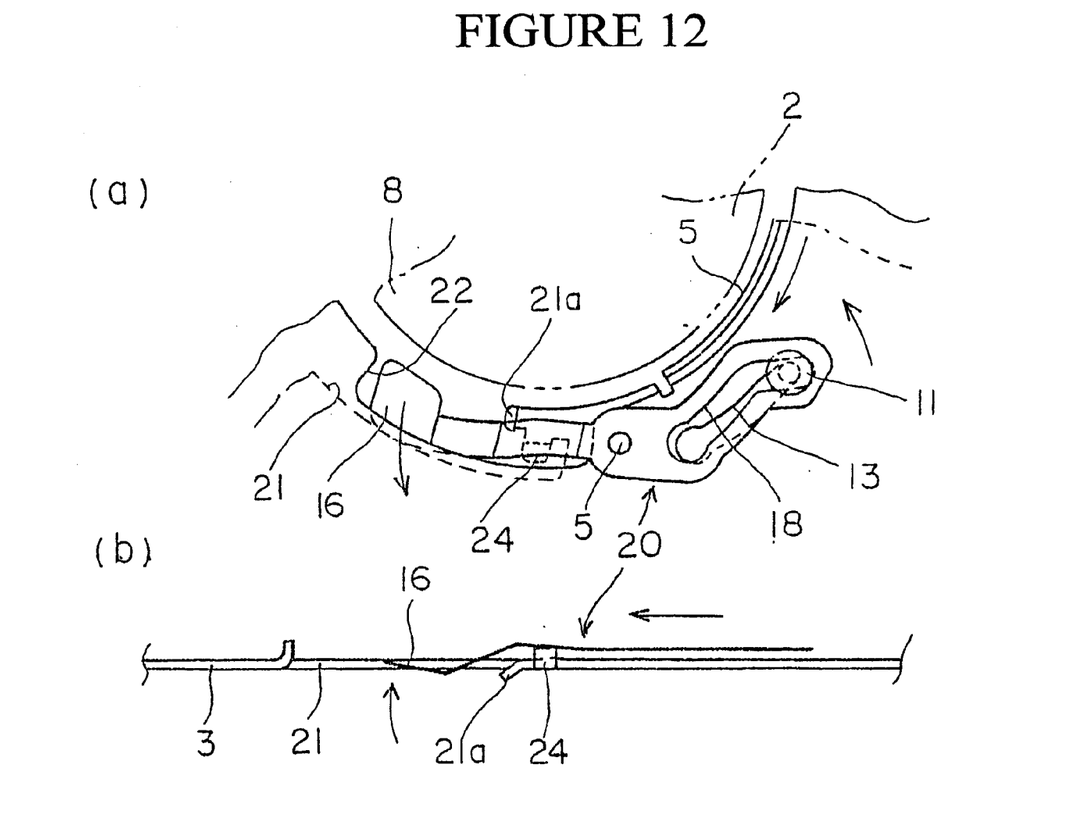
FIGS. 12A and 12B are illustrations of the operation showing a state in which the retainer piece of the holder lever released away from the clamper by the forward rotation of the clamper base is guided by a guide cam to be moved upwardly.

An embodiment of the present invention will now be described in detail with reference to FIGS. 1 and 2. FIG. 1 is a plan view showing a state in which a magnetooptical disc is clamped by a clamper of a loading device in a magnetooptical disc recording apparatus in accordance with one embodiment of the present invention. FIG. 2 is a cross-sectional view taken along the line B—B of FIG. 1. FIG. 3 is a cross-sectional view taken along the line A—A of FIG. 1. FIG. 4 is a frontal view. FIG. 5 is a plan view showing a state in which the clamper of the loading device in the magnetooptical disc recording apparatus is opened and the magnetooptical disc is loaded or unloaded. FIG. 6 is a cross-sectional view taken along the line D—D of FIG. 5. FIG. 7 is a cross-sectional view taken along the line C—C of FIG. 5. FIG. 8 is a partial cross-sectional view showing a state in which the magnetooptical disc is positioned on the clamper located immediately above the driving unit. FIG. 9 is a partial cross-sectional view showing a state in which the magnetooptical disc on the driving unit is clamped by the clamper. FIGS. 10A and 10B are illustrations of the operation showing a state in which the clamper is moved upwardly by a retainer piece of a holder lever by a reverse rotation of a clamper base. FIGS. 11A and 11B are illustrations of the operation showing a state in which the clamper is moved downwardly by the retainer piece of the holder lever by a forward rotation of the clamper base. FIGS. 12A and 12B are illustrations of the operation showing a state in which the retainer piece of the holder lever released away from the clamper by the forward rotation of the clamper base is guided by a guide cam to be moved upwardly.

As shown in FIG. 1, the magnetooptical disc recording apparatus is designated by reference numeral 1. This magnetooptical disc recording apparatus 1 serves to effect the recording and reproduction of information by using a laser beam to a magnetooptical disc DC such as DVD-ROM, CD-ROM, CD for automotive vehicles or the like and is provided with a loading device that inserts and loads the magnetooptical disc DC onto a driving unit DU, removes the used magnetooptical disc DC away from the driving unit DU to the outside or automatically loads the magnetooptical disc onto the driving unit DU from the outside.

As is well known, the loading device is adapted to insert the loaded magnetooptical disc DC in between with a clamper 2 held by an elevation mechanism 10 immediately above the driving unit DU, to support it on the driving unit DU and to be clamped by the clamper 2 lowered by the elevation mechanism 10.

More specifically, the loading device is received and held in a receiving case (not shown) of the magnetooptical disc recording apparatus 1 and is composed of a chassis 3 having a first circular opening portion 5 in a central portion of a ceiling plate 4 serving as a support surface that is rectangular in plan view and bent and formed into a U-shape in cross section, the driving unit DU drivingly rotated by a motor (not shown), having an attracting portion 6 in the central portion facing the interior of the first opening portion 5 so as to support the magnetooptical disc DC; the disc-shaped clamper 2 having at an upper surface circumferential edge a flange 8, having an attracted portion 7 in a lower surface central portion and disposed at a predetermined gap immediately above the driving unit DU, and the elevation mechanism 10 disposed to be substantially flush with an outer circumference of the clamper 2 for engaging with and disengaging with the flange 8 of the clamp 2 for the up-and-down movement.

Paying an attention to the elevation mechanism 10, it has three retainer pins 11 arranged at an equal interval on a circumference around the first opening portion 5 on the ceiling plate 4 of the chassis 3; an annular clamper base 14 in which a second opening portion 12 having substantially the same shape as that of the first opening portion 5 is formed in the central portion and three arcuate elongate holes 13 fitted and retained with the above-described three retainer pins 11 are arranged at an equal interval on the circumference around the second opening portion 12 and which is supported rotatably on the ceiling plate 4; a clamper base rotating means for drivingly rotating the clamper base 14 in a forward direction or a reverse direction along the three arcuate elongate holes 13 by the inserting or drawing action of the magnetooptical disc DC; three flexible holder levers 20 rotatably supported to three pivot shafts 15 arranged at an equal interval around the second opening portion 12 of the clamper base 14, provided at one end with retainer pieces 16 projecting and slanting downwardly to face the inside and provided at the other end with cam grooves 18 bent in the longitudinal direction and being retained with the three retainer pins 11. Three first cutaway portions 21 are formed around the circumferential edge of the first opening portion 5 of the chassis 3. Three second cutaway portions 22 are formed, corresponding to the first cutaway portions 21, also in the circumferential edge of the second opening portion 12 of the clamper base 14. A guide cam 24 for riding and deforming one end of the retainer lever 20 upwardly by the rotary action to the outside is formed to project upwardly at the end portion on the circumferential direction of each first cutaway portion 21.

Next, the clamper base rotating means is composed of a driving unit 26 disposed at a corner of the interior of the chassis 3, a toggle lever 28 for operating this driving unit 26 by the inserting action of the magnetooptical disc DC, and shifters 30a and 30b moving in a linear direction along both side walls of the interior of the chassis 3 so as to perform a relative movement by the driving unit 26, and engaged with arms 29a and 29b projecting to the right and left sides from both sides of the outer circumference of the clamper base 14 to give the rotary action to the clamper base 14. Incidentally, a guide roller is designated by reference character GR and is adapted to be driven in a forward direction or a reverse direction in order to guide the magnetooptical disc DC when the magnetooptical disc DC is to be inserted into or removed from an insertion inlet IT of the chassis 3.

The operation of the loading device according to the present invention will now be described. FIGS. 1 to 4 and 9 show a state in which the magnetooptical disc is clamped by the clamper on the driving unit. FIGS. 5 to 8 show a state in which the clamper is released away from the driving unit.

First of all, when the magnetooptical disc DC is to be loaded on the driving unit DU for rotating the magnetooptical disc DC, as shown in FIGS. 1 to 4 and 9 and FIGS. 11A and 11B, as a result of the rotation of the clamper base 14 in the forward direction (clockwise), the retainer piece 16 at one end of each holder lever 20 inserted obliquely downwardly is lowered, while supporting the clamper 2, through the first cutaway portion 21 and the second cutaway portion 22 that are substantially overlapped with each other in the vertical direction and guided and rotated outwardly by the cam groove 18.

Thus, the clamper 2 that has been released in the radially outward direction from the retainer piece 16 is lowered to seat on the driving unit DU. The attracted portion (metal plate) 7 of the lower surface of the clamper 2 is attracted to the attracting portion (electromagnet) 6 of the driving unit DU supporting the magnetooptical disc DC. When the magnetooptical disc DC carried on the driving unit DU is clamped by the clamper 2, the retainer piece 16 at one end of the holder lever 20 released away from the clamper 2 rides on the guide cam 24 and moves in a direction away from the magnetooptical disc DC (upwardly) to become in a standby condition. Under this condition, the magnetooptical disc DC is drivingly rotated by the driving unit DU.

Next, when the magnetooptical disc is to be removed or inserted, as shown in FIGS. 5 to 8 and 10A and 10B, after the retainer piece 16 at one end of the holder lever 20 is inserted in the state of being slanted below the first cutaway portion 21 and the second cutaway portion 22 by the reverse rotation of the clamper base 14, the retainer piece 16 is rotated inwardly to be retained with the lower surface of the flange 8 of the clamper 2 and moved in the same direction by the further reverse rotation of the clamper base 14.

Thus, the retainer piece 16 at one end of the holder lever 20 is swung upwardly around an end portion 21a of the circumferential direction side of the first cutaway portion 21 and kept in the standby condition at an upper position, while separating the clamper 2 from the driving unit DU to thereby form a space for the magnetic disc DC being inserted into or removed from, immediately above the driving unit DU.

Accordingly, in the loading device constructed as above, the elevation mechanism 10 is disposed to be removable in the radially outward direction at the level substantially flush with the clamper 2. The elevation mechanism is adapted to give the vertical motion and the opening and closing operation in the radial direction to the holder levers 20 in cooperation with the rotation of the clamper base 14. Accordingly, the clamper 2 is moved upwardly by engagement with the holder levers 20 when the magnetooptical disc DC is loaded or unloaded. The holder levers 20 are separated away from the magnetooptical disc DC surface through the guide cams 24 while being released outwardly from the clamper 2 when the magnetooptical disc DC is rotated. As a result, a sufficiently wide space can be maintained between the elevation mechanism 10 and the driving unit DU to make it possible to obtain the stability in operation upon the loading or unloading of the magnetooptical disc DC. It is therefore possible to realize the thinning of the loading device, hence, the magnetooptical disc recording apparatus.

The present invention has the following effects.

As described above, according to a first aspect of the invention, the elevation mechanism and the plurality of holder levers constituting the elevation mechanism are disposed removably in a radially outward direction to be substantially flush with the clamper, and are adapted to give the vertical motion and the opening and closing operation in the radial direction to the holder levers in cooperation with the rotation of the clamper base. When the magnetooptical disc is loaded or unloaded, the clamper is moved upwardly by the engagement with the holder levers. When the magnetooptical disc is rotated, the holder levers are separated away from the magnetooptical disc through the guide cams while being released outwardly from the clamper. It is therefore possible to maintain the sufficiently wide space between the elevation mechanism and the driving unit and to realize the thinning of the loading device.

What is claimed is:

1. A loading device in a magnetooptical recording apparatus for performing recording and reproducing information by using a laser beam to a magnetooptical disc;

said loading device comprising:

a chassis received and held in a receiving case of the magnetooptical disc recording apparatus, having a circular first opening portion substantially at a center and having an upper surface of a ceiling plate around said first opening portion as a support surface, a driving unit having at a central portion an attracting portion to face the interior of said first opening portion to support the magnetooptical disc and being drivingly rotated;

a disc-shaped clamper disposed at a predetermined gap immediately above said driving unit, having at a central portion of a lower surface an attracted portion and having a flange at a circumferential edge of an upper surface; and an elevation mechanism disposed to be substantially flush with an outer circumference of said clamper so as to engage with and release the circumference of the flange of the clamper to move it up and down, said elevation mechanism having a plurality of retainer pins arranged at an equal interval on a circumference around said first opening portion on the ceiling plate of said chassis; an annular clamper base in which a second opening portion having substantially the same shape as that of said first opening portion is formed in the central portion and a plurality of arcuate elongate holes fitted and retained with said plurality of retainer pins are arranged at an equal interval around said second opening portion and which is supported rotatably onto a support surface; a clamper base rotating means for drivingly rotating said clamper base along said plurality of arcuate elongate holes in a forward direction or a reverse direction by an inserting or a drawing action of the magnetooptical disc; and a plurality of flexible holder levers supported rotatably to a plurality of pivot shafts arranged at an equal interval around the second opening portion of said clamper base, provided at one end with retainer pieces projecting and slanting downwardly to face the inside and provided at the other end with cam grooves bent in a longitudinal direction for retaining said plurality of retainer pins, and a plurality of first cutaway portions being formed around a circumferential edge of said first opening portion of said chassis, a plurality of second cutaway portions being formed also in a circumferential edge of the second opening portion of said clamper base corresponding to said first cutaway portions and guide cams that move the ends of the holder levers upwardly by the rotation to the outside being formed to project at end portions of the circumferential direction sides of the respective first cutaway portions.

\* \* \* \* \*